(12) United States Patent
Ko et al.

(10) Patent No.: US 7,194,192 B2
(45) Date of Patent: Mar. 20, 2007

(54) RECORDING MEDIUM FOR STORING ENCRYPTED AUDIO DATA, APPARATUS FOR AND METHOD OF RECORDING THE SAME, AND APPARATUS FOR AND METHOD OF REPRODUCING THE SAME

(75) Inventors: Jung-Wan Ko, Yongin (KR); Jung-kwon Heo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1148 days.

(21) Appl. No.: 09/819,014

(22) Filed: Mar. 28, 2001

(65) Prior Publication Data

US 2001/0043798 A1    Nov. 22, 2001

(30) Foreign Application Priority Data

Mar. 28, 2000   (KR) .............................. 2000-15906
Apr. 18, 2000   (KR) .............................. 2000-20437

(51) Int. Cl.
  H04N 5/91    (2006.01)
  H04N 7/04    (2006.01)
  H04N 5/781   (2006.01)

(52) U.S. Cl. ..................... 386/94; 386/104; 386/105; 386/125

(58) Field of Classification Search ................ 386/94, 386/95, 96, 104, 105, 106, 124, 125, 126, 386/109, 112, 27, 46; 360/15; 725/31
See application file for complete search history.

(56) References Cited

U.S. PATENT DOCUMENTS

| | | | | |
|---|---|---|---|---|
| 4,839,746 A | * | 6/1989 | Kanamaru | ................... 386/105 |
| 5,999,697 A | * | 12/1999 | Murase et al. | ............... 386/101 |
| 6,560,403 B1 | | 5/2003 | Tanaka et al. | |
| 6,640,045 B2 | * | 10/2003 | Otomo et al. | .................. 386/95 |
| 6,971,024 B1 | | 11/2005 | Sako et al. | |
| 2002/0159765 A1 | * | 10/2002 | Maruyama et al. | ........... 386/95 |

FOREIGN PATENT DOCUMENTS

| | | |
|---|---|---|
| EP | 0 933 776 | 8/1999 |
| EP | 1 152 412 | 11/2001 |

OTHER PUBLICATIONS

Search Report issued in European Patent Application No. 01302672.9 on Aug. 14, 2006.

* cited by examiner

*Primary Examiner*—Robert Chevalier
(74) *Attorney, Agent, or Firm*—Stein, McEwen & Bui, LLP

(57) ABSTRACT

A recording medium for storing encrypted audio data, an apparatus and a method for recording the same, and an apparatus and a method for reproducing the same. Encrypted and unencrypted audio data corresponding to an audio program to be reproduced, such as a musical selection, are recorded in different areas of a recording medium. The encrypted audio data allows a reproduction of the audio program with a sound quality far better than a reproduction of the audio program using the audio data which is not encrypted. The audio data is encrypted and recorded to prevent illegal copying of the higher quality sound data. Accordingly, audio data may be reproduced using the unencrypted audio data in a reproducing apparatus complying with existing specifications. Higher quality audio may be reproduced from the encrypted audio data using the present invention.

50 Claims, 6 Drawing Sheets

RECORDING MEDIUM FOR STORING ENCRYPTED AUDIO DATA, APPARATUS FOR AND METHOD OF RECORDING THE SAME, AND APPARATUS FOR AND METHOD OF REPRODUCING THE SAME

CROSS-REFERENCE TO RELATED APPLICATIONS

This application claims the benefit of Korean Application Nos. 00-15906 and 00-20437 filed Mar. 28, 2000 and Apr. 18, 2000 in the Korean Patent Office, the disclosures of which are incorporated herein by reference.

BACKGROUND OF THE INVENTION

1. Field of the Invention

The present invention relates to the field of recording and/or reproducing audio and video data on a digital recording medium, and more particularly, to a recording medium for storing audio data encrypted to prevent illegal copying, an apparatus for and a method of recording the same, and an apparatus for and a method of reproducing the same.

2. Description of the Related Art

An example of a digital recording medium for recording digital video and/or audio information is a digital versatile disc (DVD). Specifications for recording audio information on a DVD include, for example, a DVD specification for Read-Only Disc, Part 3, Video Specifications, Version 1.0, August 1995 (the DVD-Video Specification), and a DVD Specification for Read-Only Disc, Part 4, Audio Specifications, Version 1.0, March 1999, (the DVD-Audio Specification).

According to these specifications, high-quality video and audio information can be recorded on a disc. However, due to the characteristics of digital information, making a copy which reproduces sound almost the same as the original sound and picture is possible, and therefore a means to prevent illegal copying is needed.

A method which is widely used recently as a method for preventing illegal copying is to encrypt the recorded information. In the encryption method, all information or the most important part to be used in interpreting the information is encrypted so that copies cannot be used where the information is illegally copied.

However, the DVD-Video recording and/or reproducing apparatus and the DVD-Audio recording and/or reproducing apparatus define respective encryption methods for preventing illegal copying.

Since the DVD-Audio specification does not include provisions for moving pictures, in case of a music video, for which moving pictures and music are recorded together, moving picture information and music information are first made according to the DVD-Video specifications and recorded in a video region. Then, reproducing information for reproducing moving picture information and reproducing information for reproducing music information are recorded in a DVD-Video region and a DVD-Audio region, respectively, so that a DVD-Audio apparatus can reproduce both moving picture information and music information.

Meanwhile, since the DVD-Video specification is defined from the viewpoint that moving pictures are main and sound is auxiliary, the encryption method is applied only to video information and not applied to audio information. According to this, the decoding speed of the decoder can be raised, but prevention of illegal copying of audio information is difficult, which is contained in the music video and is very worthy of protection. Also, in case where audio information is encrypted according to a specification other than the existing DVD-Video specification, the audio information cannot be reproduced through the existing DVD-Video reproducing apparatus.

Figure 1:
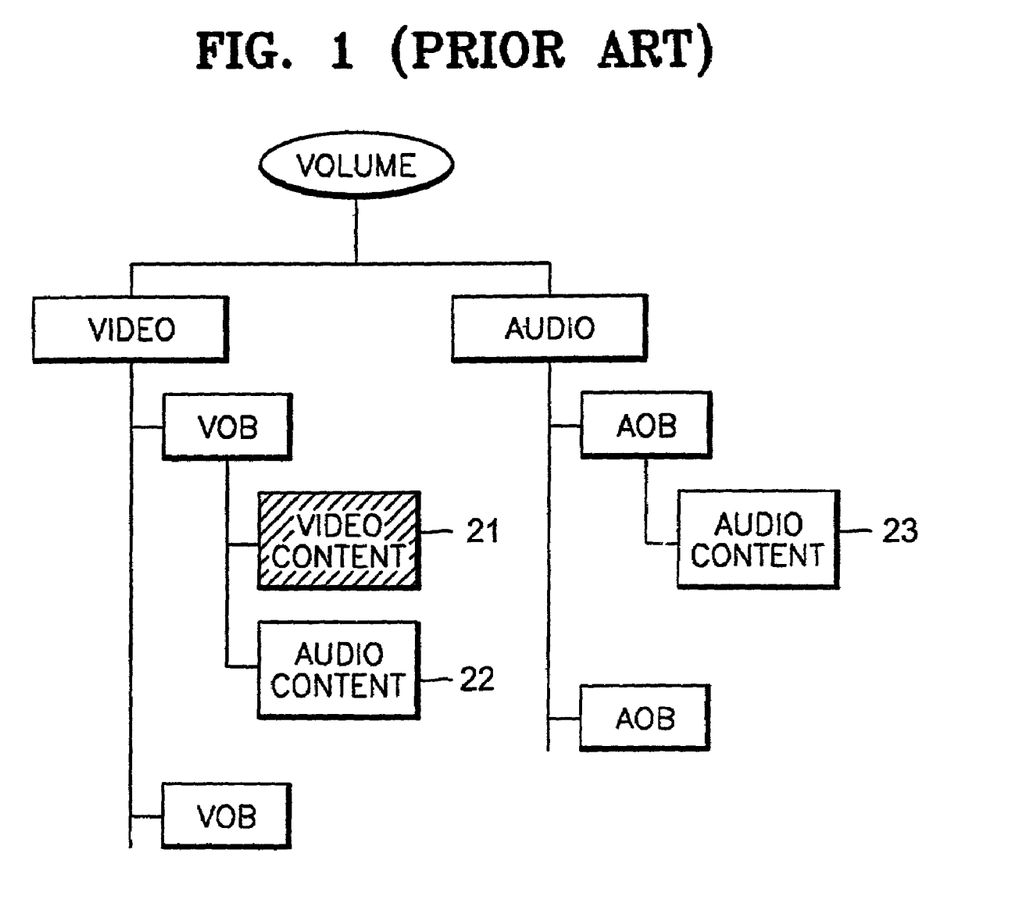
FIG. 1 illustrates the data structure on a recording medium complying with existing DVD-Video and DVD-Audio specifications.

FIG. 1 illustrates the data structure on a DVD-ROM disc complying with the existing DVD-Video and DVD-Audio specifications, and explains the existing method for encrypting video information and audio information.

On the DVD-Video region on the DVD-ROM disc, video information 21, which can be protected from illegal copying through encryption, and audio information 22, which is not encrypted, are recorded. Also, reproducing management information (not shown) for reproducing the information is recorded.

On the DVD-Audio region of the DVD-ROM disc, audio information 23, which can be protected from illegal copying through an encryption method different from that of the video information, is recorded. Also in the DVD-Audio region, reproducing management information (not shown) for reproducing audio information 23, reproducing management information (not shown) for reproducing video information 21 and audio information 22 recorded in the DVD-Video region, and/or reproducing management information (not shown) for reproducing only audio information 22 recorded in the DVD-Video region are recorded.

Meanwhile, the DVD-Video specification defines provisions for encrypting only video information and does not provide an encryption method for encrypting audio information. That is, according to the DVD-Video specification, in case of music video in which audio information is main and moving picture information is auxiliary, encryption of the audio information, which is very worthy of protection, is impossible.

Also, the DVD-Audio specification does not stipulate a method or standard for recording moving picture information in a DVD-Audio region. Therefore, in the DVD-Audio specification, moving picture information cannot be recorded in the DVD-Audio region, and only reproducing management information for reproducing moving picture information recorded in the DVD-Video region, is recorded in the DVD-Audio region.

That is, only with the existing DVD-Audio specification and DVD-Video specification, a recording medium having a desired means for preventing illegal copying cannot be provided. Also, in a reproducing apparatus, which is made to reproduce DVD-Video information generated according to the existing DVD-Video specification, audio information recorded after being encrypted in a predetermined encryption method cannot be reproduced together with video information.

SUMMARY OF THE INVENTION

To solve the above problems, an object of the present invention is to provide a recording medium, on which encrypted audio data is recorded together with moving picture data.

It is another object to provide a recording medium, on which encrypted audio data, which is compatible with the existing specifications such as DVD-Video and DVD-Audio specifications, and audio data, which is not encrypted, are recorded together with moving picture data.

It is another object to provide a recording apparatus, which encrypts audio data and records the encrypted audio data together with moving picture data.

It is another object to provide a recording apparatus, which records encrypted audio data, which is compatible with the existing specifications, and audio data, which is not encrypted, together with moving picture data.

It is another object to provide a reproducing apparatus, which reproduces encrypted audio data from a recording medium on which the audio data is encrypted and recorded together with moving picture data.

It is another object to provide a recording method for encrypting audio data and recording the encrypted audio data together with moving picture data.

It is another object to provide a recording method for recording encrypted audio data, which is compatible with the existing specifications, and audio data, which is not encrypted, together with moving picture data.

It is another object to provide a reproducing method for reproducing encrypted audio data from a recording medium on which audio data is encrypted and the encrypted audio data is recorded together with moving picture data.

Additional objects and advantages of the invention will be set forth in part in the description which follows, and, in part, will be obvious from the description, or may be learned by practice of the invention.

To accomplish the above and other objects of the present invention, there is provided a recording medium comprising a video region, in which moving picture data and first audio data which is not encrypted is recorded, and an audio region, in which audio data and related additional information is recorded, the recording medium having a video region in which encrypted second audio data is recorded; and a predetermined region in which reproducing management information which reproduces video data and/or the encrypted second audio data of the video region is stored.

There is also provided a recording apparatus comprising a first encryptor which encrypts input moving picture data; a second encryptor which encrypts input audio data; and a recording processor which records the encrypted audio data and moving picture data in a predetermined format in the video region of a recording medium, and recording reproducing management information which reproduces the encrypted audio data and/or video data, in a predetermined region of the recording medium.

There is also provided a reproducing apparatus for reproducing a recording medium comprising separate regions, a video region and an audio region, moving picture data and audio data, both data recorded in the video region, and reproducing management information, which is recorded in a predetermined region and used to reproduce the moving picture data and/or the audio data, the reproducing apparatus comprising a reproducing processor which analyzes whether audio data and/or video data recorded on the recording medium are encrypted and the encryption method, based on the reproducing management information read from the recording medium; a first decryptor which decrypts moving picture data read from the recording medium, according to information on whether the data is encrypted and the encryption method provided from the reproducing processor; and a second decryptor which decrypts audio data read from the recording medium, according to information on whether the data is encrypted and the encryption method provided from the reproducing processor.

There is also provided a recording method for recording data on a recording medium comprising a video region in which moving picture data is recorded, and an audio region in which audio data and related additional information is recorded, the recording method comprising encrypting input video data and/or audio data, and recording the encrypted video data and/or encrypted audio data in the video region; and recording reproducing management information for reproducing the encrypted video data and/or encrypted audio data, in a predetermined region.

There is also provided a reproducing method for reproducing a recording medium comprising separate regions, a video region and an audio region, moving picture data and encrypted audio data, both data recorded in the video region, and reproducing management information, which is recorded in a predetermined region and used to reproduce the moving picture data and/or the audio data, the reproducing method comprising analyzing whether audio data recorded on the recording medium is encrypted and the encryption method, based on the reproducing management information read from the recording medium; and decrypting audio data read from the recording medium, according to information on whether the data is encrypted and the encryption method, and decoding the decrypted audio data.

BRIEF DESCRIPTION OF THE DRAWINGS

The above objects and advantages of the present invention will become more apparent by describing in detail the several embodiments thereof with reference to the attached drawings in which.

DESCRIPTION OF THE PREFERRED EMBODIMENTS

Reference will now be made in detail to the present embodiments of the present invention, examples of which are illustrated in the accompanying drawings, wherein like reference numerals refer to like elements throughout.

Figure 2:
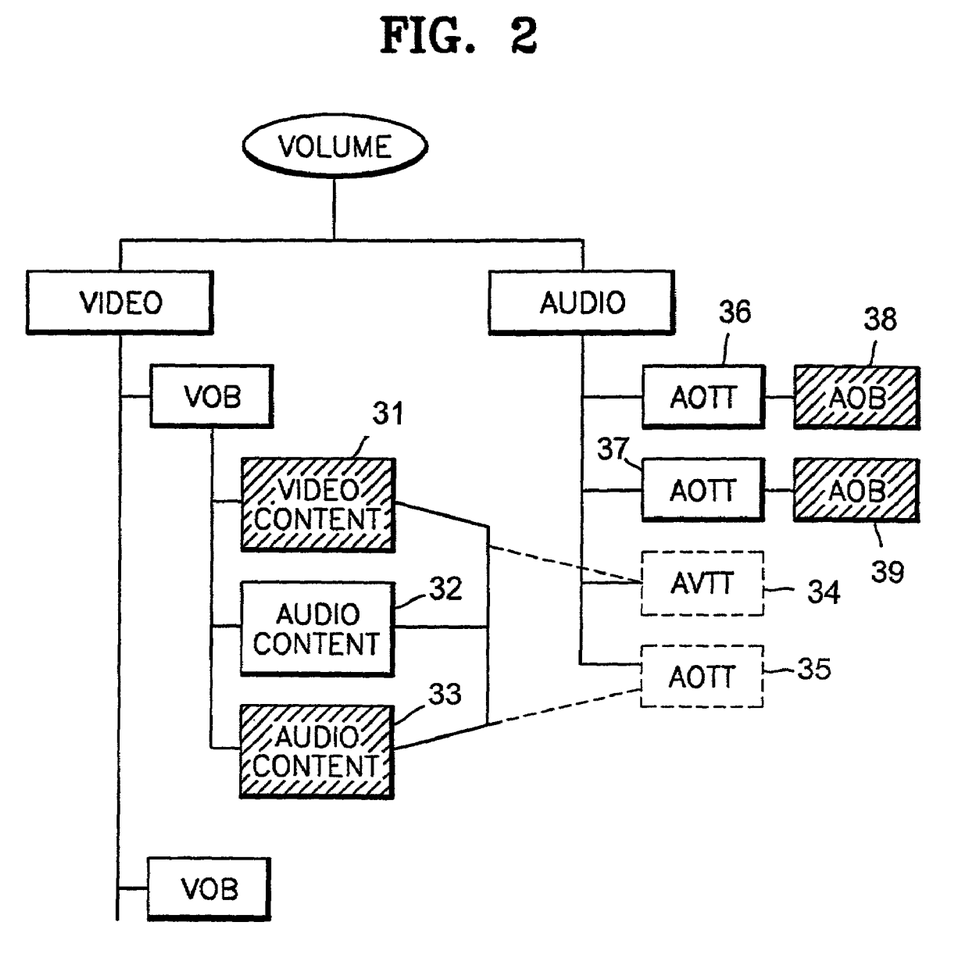
FIG. 2 illustrates the data structure on a recording medium, which is compatible with the existing DVD-Video and DVD-Audio specifications, and on which audio data encrypted according to the present invention is recorded.

FIG. 2 illustrates a data structure on a recording medium, which is compatible with the existing DVD-Video and DVD-Audio specifications, and on which audio data encrypted according to the present invention is recorded. An example of a disc used in the present invention is a DVD-ROM having a 4.7-GByte capacity for recording video and audio information complying with the DVD-Video specification and audio information complying with the DVD-Audio specification.

On the region for DVD-Video of a disc according to the present invention, encrypted video data 31 and audio data which is not encrypted 32 (hereinafter, referred to as a first audio data) are multiplexed and recorded complying with the DVD-Video specification. Also, reproducing information (not shown) for reproducing these data 31 and 32 is recorded as management information in the DVD-Video region.

Meanwhile, the video data 31, the first audio data 32, and encrypted audio data 33 (hereinafter, referred to as a second audio data) are multiplexed and recorded. However, management information on the second audio data 33 is recorded so that the existing DVD-Video reproducing apparatus cannot reproduce the management data.

That is, the reproducing management information of the video data 31 and the first audio data 32, the management information for reproducing only the first audio data 32, the reproducing management information of the video data 31 and the second audio data 33, the management information for reproducing only the second audio data 33 are recorded in the DVD-Audio region. Here, the reproducing management information of the video data 31 and the first audio data 32, and the reproducing management information of the video data 31 and the second audio data 32 are recorded in an audio with video title (AVTT) 34, and the management information for reproducing only the first audio data 32 and the management information for reproducing only the second audio data 33 are recorded in an audio only title (AOTT) 35. Also, in the DVD-Audio region, audio data 38 and 39 which are encrypted complying with the DVD-Audio specification, together with the reproducing management information 36 and 37 for reproducing these audio data 38 and 39 are recorded in the AOTTs 36 and 37.

In a reproducing apparatus comprising only an audio decoder, only audio data in the music video information is reproduced. For this, separately from the information structure for reproducing video and audio data, the music video disc may have an information structure for reproducing only audio data. Using this information structure, an apparatus for reproducing only for audio data can access and reproduce only audio data in the music video information.

In the information structure for reproducing only audio data, information on the audio data in the music video information is recorded. The information on the audio data comprises information on whether the audio data is encrypted to prevent illegal copying, and if the audio data is encrypted, in which encryption method the audio data is encrypted.

As an example of implementation, in case of a DVD music video disc, in which music video is recorded on a DVD, a video object (VOB) for music video is recorded in the DVD-Video region, and video data and audio data are recorded in a VOB. In the DVD-Audio region, an audio object (AOB), and AOTT and AVTT, each of which is an information structure for reproducing, are recorded. The reproducing information for reproducing only the audio data is recorded in the AOTT, while the reproducing information for reproducing both video data and audio data is recorded in the AVTT.

Referring to FIG. 2, in the DVD-Audio region, the AOTTs 36 and 37, each of which has a corresponding AOB, comprise reproducing information for reproducing the corresponding linked AOBs. The AOTT 34 and the AVTT 35 do not have their own AOBs and only contain reproducing information for reproducing VOBs in the DVD-Video region. In a case where data is reproduced using only the AVTT 35, both video data and audio data of the VOB data in the DVD-Video region are reproduced. In a case where data is reproduced using the AOTT 34, only audio data of the VOB data in the DVD-Video region is reproduced.

Although an encryption method to prevent illegal copying is applied only to video data of the VOB in the existing DVD-Video region, an encryption method is also applied to the audio data of the VOB, which is separately reproduced by being linked to the AVTT and/or the AOTT recorded in the DVD-Audio region, in the present invention. Information on whether an encryption method is applied and on which encryption method is applied is recorded in the AOTT linked to the corresponding audio data.

For example, in a case where an encryption method defined in the DVD-Video specification is applied to the video data recorded in the VOB of the DVD-Video region and an encryption method defined in the DVD-Audio specification is applied to the audio data recorded in the AOB of the DVD-Audio region, an encryption method defined in the DVD-Video specification or an encryption method defined in the DVD-Audio specification is also applied to the audio data in the VOB, which is separately reproduced by being linked to the AOTT recorded in the DVD-Audio region.

However, since the existing DVD-Video reproducing apparatus can decrypt and reproduce only encrypted video data, the apparatus cannot reproduce audio data if an encryption method is applied to the audio data of the VOB. Therefore, audio data which is not encrypted is additionally recorded in the VOB. The audio data which is not encrypted has the same content as the audio data, which is encrypted and recorded in the VOB, but is recorded with a lower quality sound and/or less channels. For example, the audio data is encoded with a lower sampling frequency, less quantization bits, or a lower bit rates, and recorded. Therefore, the existing DVD-Video reproducing apparatus can simultaneously reproduce audio data and video data using audio data, which has a lower quality sound and is not encrypted, and video data. Meanwhile, a reproducing apparatus which reproduces a DVD music video disc according to the present invention can reproduce audio data having a high quality sound, and video data, because the apparatus can decrypt and decode the encrypted audio data.

Meanwhile, in a case where data on a disc having the data structure shown in FIG. 2 is reproduced in the existing DVD-Video reproducing apparatus, the encrypted audio data is seen as audio data which can be reproduced, on the reproducing list. However, the encrypted audio data cannot be reproduced indeed. Therefore, a definition is needed to make the encrypted audio data seen as audio data which cannot be reproduced, on the reproducing list, even where data on a disc having the data structure shown in FIG. 2 is reproduced in the existing DVD-Video reproducing apparatus. Also, in a reproducing apparatus which can reproduce encrypted audio data, definition of separate identification information in the DVD-Video region as shown in FIG. 3 is necessary, so that the encrypted audio data, which is seen as audio data which cannot be reproduced on the reproducing list, is seen as audio data which can be reproduced.

Figure 3:
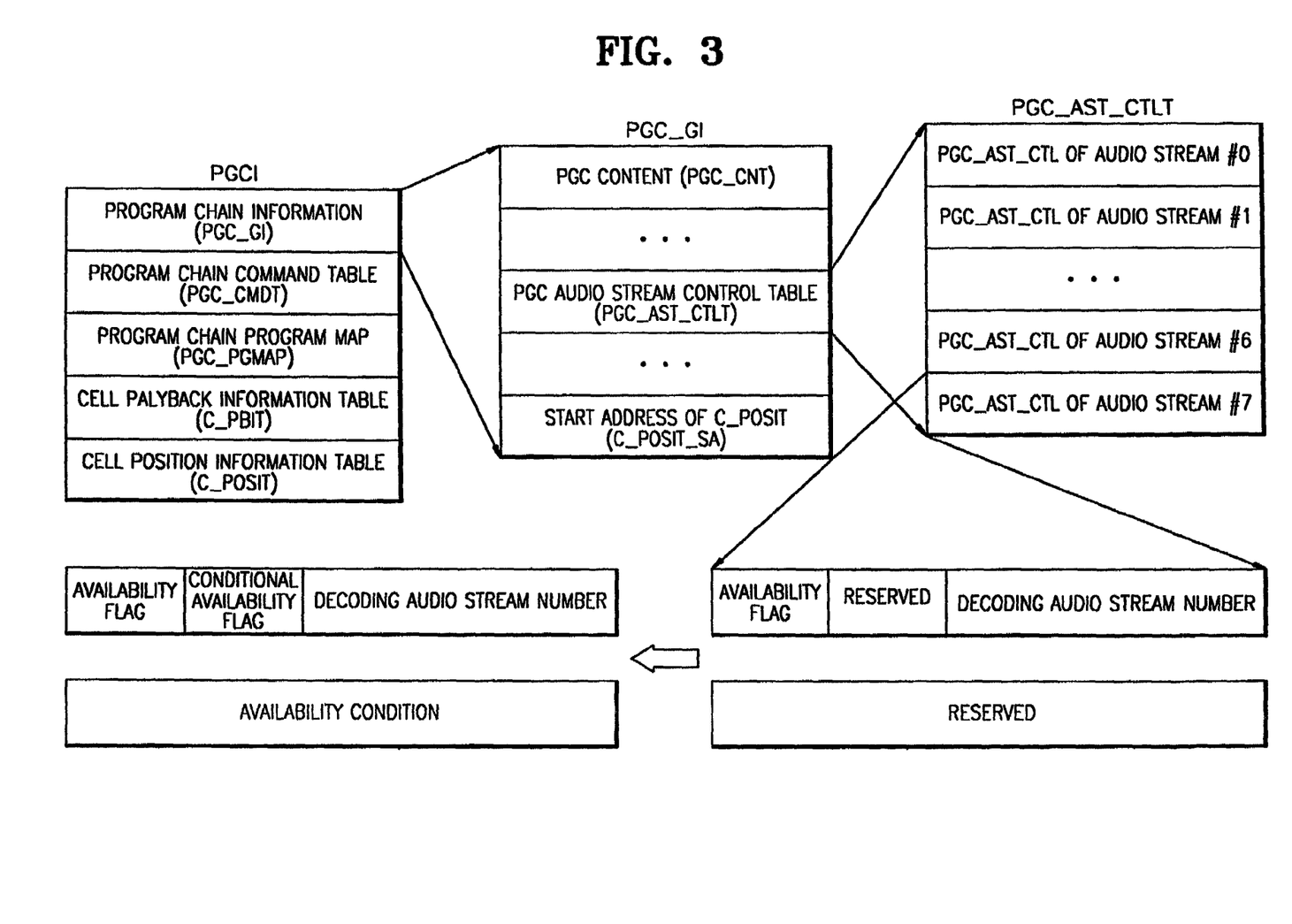
FIG. 3 illustrates the structure of identification information complying with a DVD-Video specification which can distinguish encrypted audio data according to the present invention.

FIG. 3 illustrates the structure of program chain information (PGCI), which is management information of the DVD-Video region and comprises identification information which complies with the DVD-Video specification and can distinguish encrypted audio data according to the present invention.

The DVD-Video region comprises the management information structure of a program chain (PGC), and the management information which records information on the PGC is the PGCI. The PGCI comprises program chain general information (PGC_GI), and the PGC_GI comprises a PGC audio stream control table (PGC_AST_CTLT), which has an information structure having control information on each audio information of a PGC. In response to the audio information recorded after being encrypted, among the PGC_AST_CTLs recorded in the PGC_AST_CTLT, a predetermined condition, including encryption-related information which controls reproduction of audio information encrypted, is recorded in the corresponding PGC_AST_CTL.

In the PGC_AST_CTL, a flag which indicates whether audio information can be reproduced, which is the information on whether audio information indicated by the corresponding PGC_AST_CTL is used in the corresponding PGC, and a decoding audio stream number, which is the stream number of audio information indicated by the corresponding PGC_AST_CTL, are recorded. In the PGC_AST_CTL corresponding to the audio information which is recorded without encryption, an availability flag indicating whether audio data is reproducible is set so that the audio data is usable in the corresponding PGC, and the stream number of the corresponding audio information is recorded in the decoding audio stream number so that the audio data can be reproduced in the existing DVD-Video reproducing apparatus. Also, in the PGC_AST_CTL corresponding to the encrypted audio information, an availability flag indicating whether audio data can be reproduced is set as a conditional availability flag, which indicates that audio data can be conditionally reproduced, so that the audio data cannot be used in the existing DVD-Video reproducing apparatus, and can be used in a reproducing apparatus satisfying predetermined conditions. At the same time, the predetermined conditions including the encryption method related to the reproduction of the encrypted audio information is recorded in a reserved region of the PGC_AST_CLT, which is not used in the existing DVD-Video format. The stream number of encrypted audio information is recorded in the Decoding Audio stream number so that the existing DVD-Video reproducing apparatus cannot reproduce the encrypted audio information, and only a reproducing apparatus, which can recognize the predetermined conditions and satisfies the predetermined conditions, can reproduce the corresponding encrypted audio information.

Figure 4:
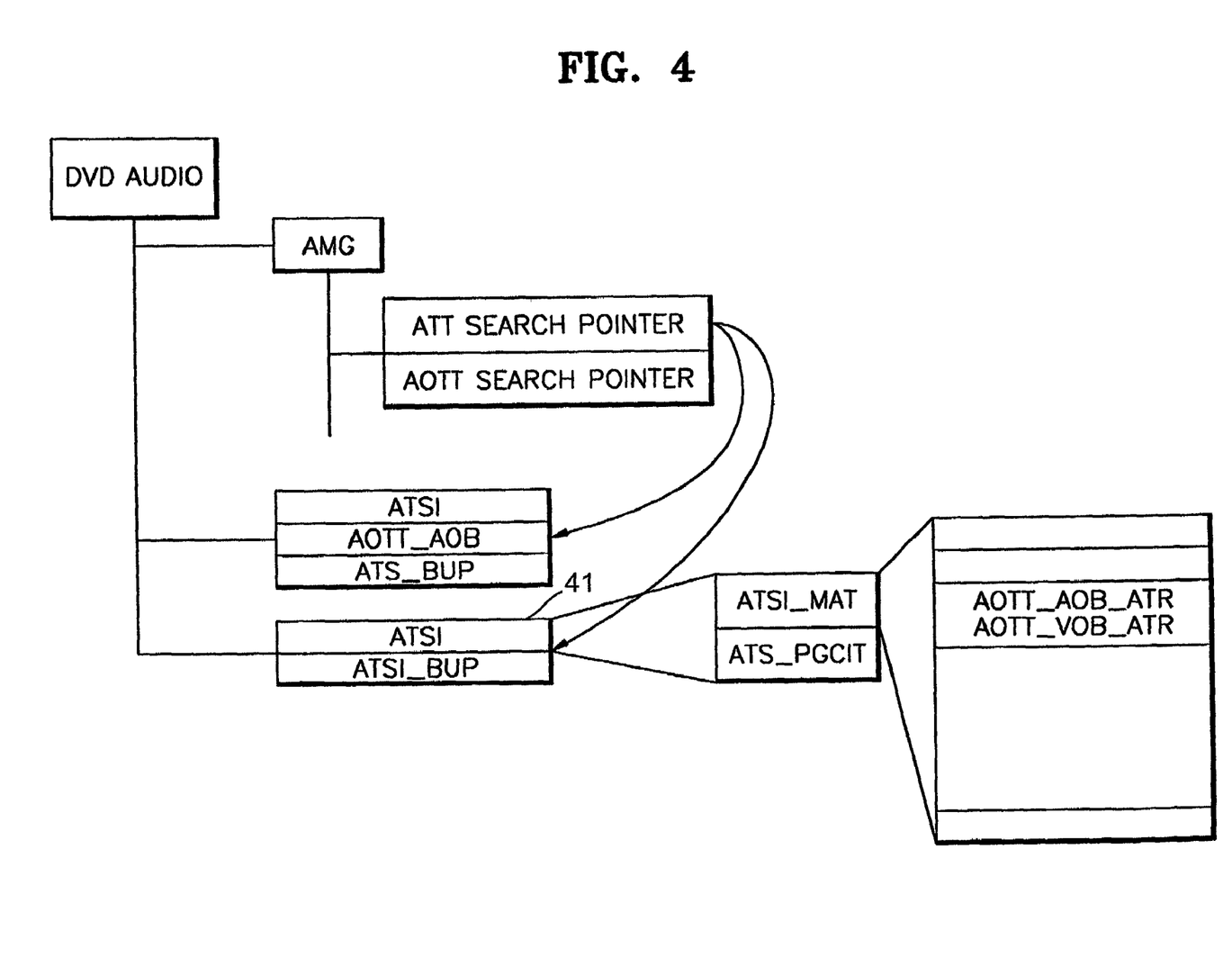
FIG. 4 illustrates the structure of identification information complying with a DVD-Audio specification which can distinguish encrypted audio data according to the present invention.

FIG. 4 illustrates the structure of management information in which identification information, which complies with the DVD-Audio specification and can distinguish encrypted audio data according to the present invention, is stored.

In the DVD-Audio region, an information structure, referred to as AMG, which manages all the DVD-Audio region, an information structure, referred to as ATS information (ATSI), which is on each audio title set (ATS), and the copy of the ATSI, referred to as ATSI_BUP, are recorded. Also, AOB, which is data contained in each ATSI, is included in the DVD-Audio region.

As shown in FIG. 4, in the DVD-Audio region, an AOTT 41, which is formed only of an ATSI and an ATSI_BUP, and has no AOB, is included, and is the AOTT which reproduces only audio data in the music video data recorded in the DVD-Video region. The corresponding ATSI comprises an information structure, referred to as an ATSI management table (ATSI_MAT), which manages all the ATSI, and an ATS program chain information table (ATS_PGCIT). In the ATSI_MAT information structure, eight (8) information structures, each of which is referred to as an audio title video object attribute (AOTT_VOB_ATR). This information structure, AOTT_VOB_ATR, is a place which records attribute information of each of audio information recorded in the VOB used by the corresponding ATS. In this place, information related to the encryption method of the encrypted audio information contained in the corresponding VOB is recorded. In the audio title audio object attribute (AOTT_AOB_ATR) in the ATSI_MAT information structure, attribute information of the audio information recorded in the AOB of the DVD-Audio region is recorded.

Information complying with the existing DVD-Audio specification is recorded in the AOTT_VOB_ATR corresponding to the audio information which is recorded without encryption, and the predetermined conditions including the encryption method information related to the corresponding audio information are recorded in the AOTT_VOB_ATR corresponding to the encrypted audio information, so that the encrypted audio information can be used in a reproducing apparatus satisfying the corresponding predetermined conditions.

Figure 5:
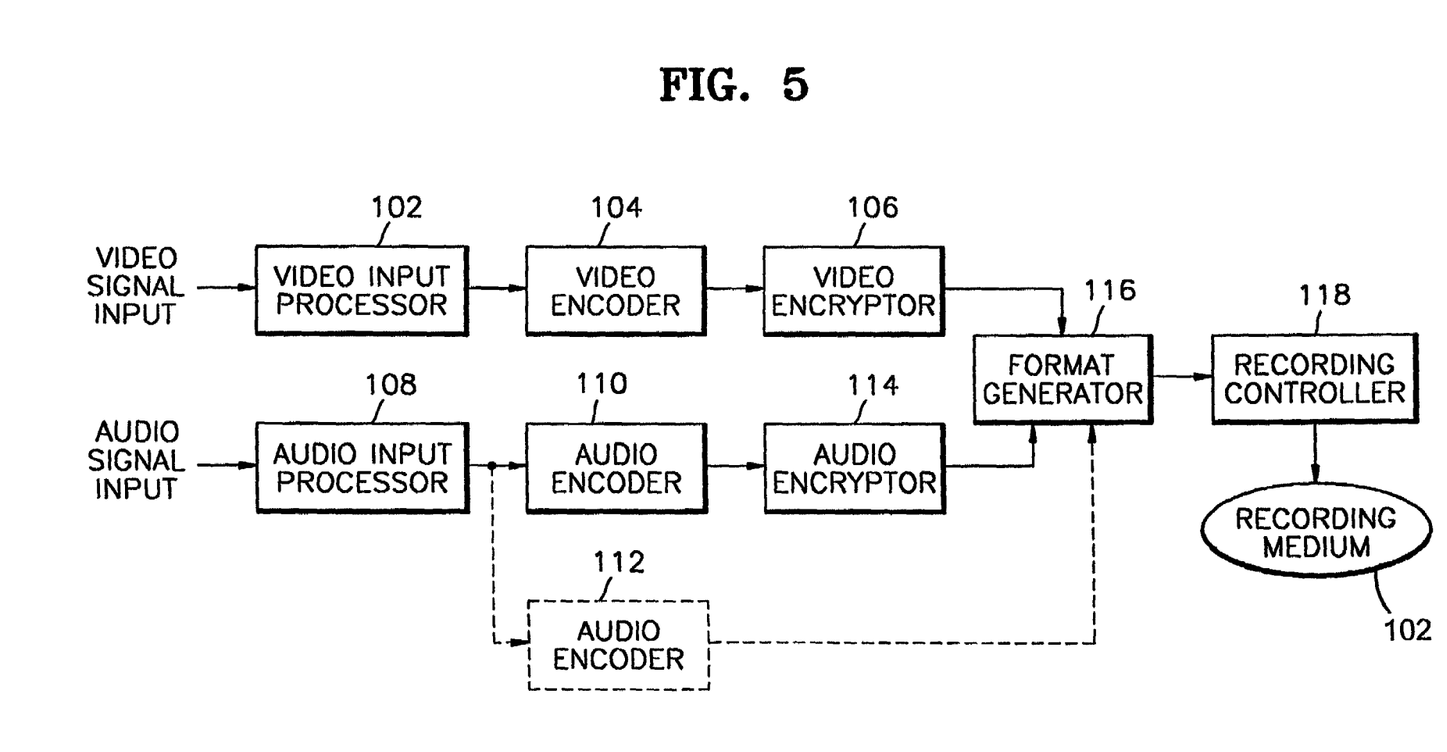
FIG. 5 is a block diagram according to an embodiment of a recording apparatus which records audio data encrypted according to the present invention.

Referring now to FIG. 5, an embodiment of a recording apparatus which records audio data encrypted according to the present invention is shown in the form of a block diagram. A video input processor 102 converts an input video signal into a form suitable for processing by a video encoder 104. The video encoder 104 encodes the converted video signal in a predetermined format, and provides the encoded video data to a video encryptor 106. The video encryptor 106 encrypts the encoded video data with an encryption method according to a predetermined specification, and provides the encrypted video data to a format generator 116.

An audio input processor 108 converts an input audio signal into a form suitable for processing by an audio encoder 110, and the audio encoder 110 encodes the converted audio signal in a predetermined format, and provides the encoded audio data to an audio encryptor 114. The audio encryptor 114 encrypts the encoded audio data with an encryption method according a predetermined specification, and provides the encrypted audio data to a format generator 116.

The format generator 116 forms encrypted audio and video data into data having predetermined formats, and forms information structures which reproduce the corresponding video data and audio data. The formed data and information structures are recorded in a recording medium 120 through a recording controller 118 having a recording mechanism. Here, the video encryptor 106 and audio encryptor 114 can be referred to as a first encryptor and a second encryptor, respectively. Also, the format generator 116 and the recording controller 118 can be referred to as a recording processor.

The recording apparatus according to the present invention may further comprise an audio encoder 112 which additionally records audio data, which is not encrypted, so as to have a compatibility with a conventional video reproducing apparatus. The output of the audio encoder 112 is directly provided to the format generator 116 without applying the audio encryption method, and then formatted and recorded, so as to be reproduced by a conventional DVD-Video reproducing apparatus.

Where the recording apparatus shown in FIG. 5 is a DVD music video recording apparatus, the format generator 116 identifies a DVD-Video region and a DVD-Audio region, and in the VOB of the DVD-Video region, records video data, to which an encryption method defined in the DVD-Video specification is applied, and audio data, to which an encryption method defined in the DVD-Video specification, or an encryption method defined in the DVD-Audio specification is applied. Also, in the VOB of the DVD-Video region, audio data, which passes the audio encoder 112 without applying the encryption method defined in the DVD-Video specification or the encryption method defined in the DVD-Audio specification, can be recorded together. The recording apparatus shown in FIG. 5 may have another encoder which encodes audio data, which is to be recorded in the DVD-Audio region shown in FIG. 2, in a predetermined format.

In the DVD-Audio region, reproducing information for reproducing the audio data of the VOB of the DVD-Video region is recorded in the AOTT having the structure shown in FIG. 4, and information related to encryption of the corresponding audio data is also recorded in the AOTT. Here, the information related to encryption of the corresponding encrypted audio data can be recorded in the PGCI having the structure shown in FIG. 3.

Figure 6:
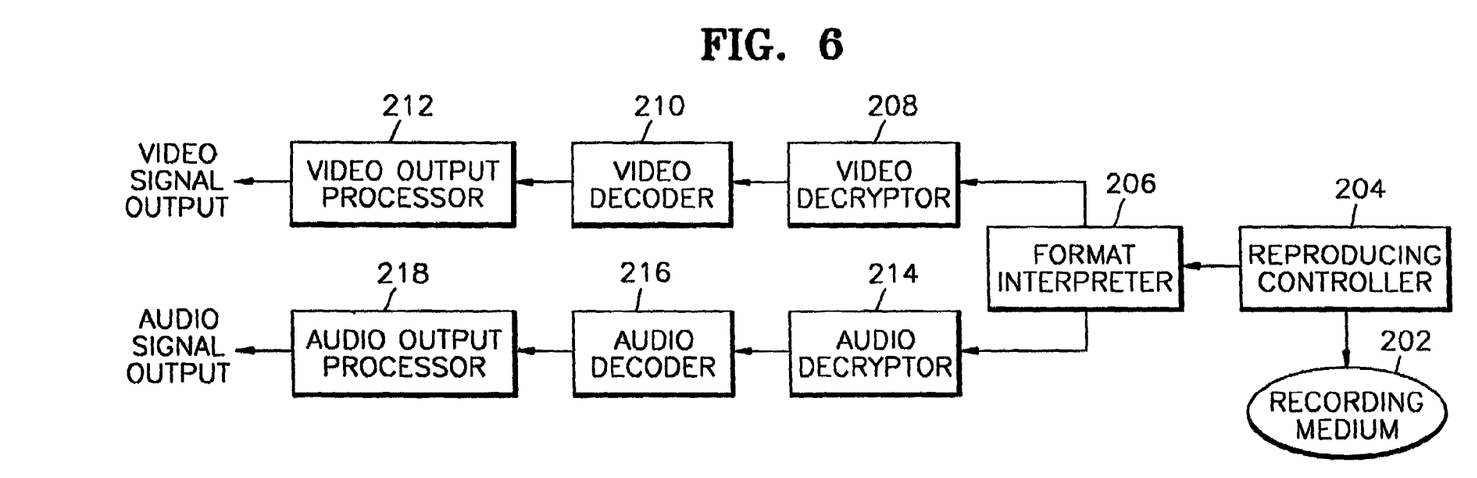
FIG. 6 is a block diagram according to an embodiment of a reproducing apparatus which reproduces audio data encrypted according to the present invention.

FIG. 6 is a block diagram according to an embodiment of a reproducing apparatus according to the present invention, and shows the structure of a music video reproducing apparatus which can reproduce both video and audio data.

A reproducing controller 204 having a reproducing mechanism reads data recorded in a recording medium 202 and provides the read data to a format interpreter 206. The format interpreter 206 interprets the read data, checks the locations of video data and audio data and illegal copying prevention states, then divides video data and audio data, and provides the video data to a video decryptor 208 and the audio data to an audio decryptor 214. The video decryptor 208 decrypts the video data provided by the format interpreter 206. A video decoder 210 decodes the decrypted video data. A video output processor 212 processes the decoded video data into a video signal appropriate to the output apparatus and outputs the processed video signal.

If an encryption method is applied to the audio data provided by the format interpreter 206, the audio interpreter 214 decrypts the audio data in the corresponding method, and if the audio data is not encrypted, provides the audio data to an audio decoder 216 without decryption. The audio decoder 216 decodes the audio data output from the audio decryptor 214, and an audio output processor 218 processes the decoded audio data into an audio signal appropriate to the output apparatus and outputs the processed audio signal. Here, the video decryptor 208 and the audio decryptor 214 can be referred to as a first decryptor and a second decryptor, respectively, and the reproducing controller 204 and the format interpreter 206 can be referred to as a reproducing processor. The reproducing apparatus shown in FIG. 6 may further comprise a separate audio decoder which decodes audio data recorded in the DVD-Audio region.

In a case of a DVD music video reproducing apparatus which can reproduce both video and audio data, the format interpreter 206 interprets the information structures (FIGS. 3 and/or 4) for reproducing video data and audio data respectively recorded in the DVD-Audio region and/or the DVD-Audio region, and reproduces video data and audio data recorded in the VOB of the DVD-Video region according to the interpreted reproducing information. At this time, if information related to the encryption method of the corresponding audio data is recorded in the reproducing information, the audio decryptor 214 is operated according to the information related to the encryption method.

Figure 7:
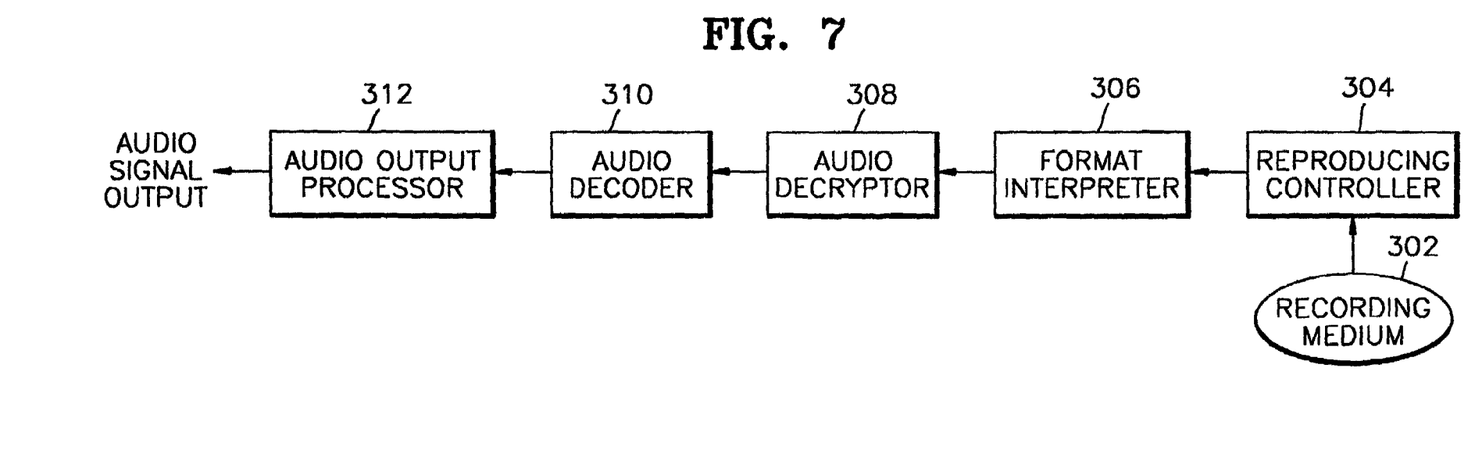
FIG. 7 is a block diagram according to another embodiment of a reproducing apparatus which reproduces audio data encrypted according to the present invention.

FIG. 7 is a block diagram according to another embodiment of a reproducing apparatus according to the present invention, and shows the structure of a music video reproducing apparatus which reproduces only audio data.

A reproducing controller 304 reads data recorded on a recording medium 302 and provides the read data to a format interpreter 306. The format interpreter 306 interprets the read data, checks the locations of the video data and audio data, and illegal copying prevention states, using the information structure for reproducing only the interpreted audio data, then separates the audio data from the read data, and provides the audio data to an audio decryptor 308.

If an encryption method is applied to the audio data provided by the format interpreter 306, the audio decryptor 308 decrypts the audio data using a corresponding method, and provides the decrypted audio data to an audio decoder 310. If the audio data is not encrypted, the audio decryptor 308 provides the audio data to the audio decoder 310 without decryption. The audio decoder 310 decodes audio data output from the audio decryptor 308, and an audio output processor 312 processes the decoded audio data into an audio signal appropriate to the output apparatus and outputs the processed audio signal.

In a case of a DVD music video reproducing apparatus which reproduces only audio data, the format interpreter 306 interprets the AOTT of FIG. 4, which is an information structure for reproducing only audio data in the DVD-Audio region, and reproduces audio data in the VOB in the DVD-Video region linked to the corresponding AOTT. At this time, if information related to the encryption method of the corresponding audio data is recorded in the corresponding AOTT, the audio decryptor 308 is operated according to the information related to the encryption method.

As described above, in the present invention, for compatibility with the existing specifications, encrypted audio data and audio data which is not encrypted are recorded together with video data. By doing so, video data and two-types of audio data are reproducible in each combination (video+encrypted audio, and video+audio data which is not encrypted), while only audio data can be separately reproduced.

In addition, in the present invention, both encrypted audio data and audio data which is not encrypted are prepared together so that audio data is reproducible in a reproducing apparatus complying with the existing specifications, while higher quality audio can be reproduced in the reproducing apparatus according to the present invention, and protection of copyright is enabled.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A recording medium comprising:
   a video region which stores moving picture data, first audio data which is not encrypted and second audio data which is encrypted;
   an audio region which stores third audio data and related additional information; and
   a predetermined region which stores reproducing management information enabling a reproducing apparatus to reproduce the moving picture data and/or the encrypted second audio data of the video region.

2. The recording medium of claim 1, wherein the second audio data is encrypted by an encryption method used in a DVD-Video specification.

3. The recording medium of claim 1, wherein the second audio data is encrypted by an encryption method used in a DVD-Audio specification.

4. The recording medium of claim 1, wherein the reproducing management information comprises information related to the encryption of the second audio data and is stored in the video region.

5. The recording medium of claim 4, wherein the reproducing management information is stored in a program chain information (PGCI) region of the video region.

6. The recording medium of claim 1, wherein reproducing management information of video data and/or audio data of the video region is stored in the audio region.

7. The recording medium of claim 6, wherein the reproducing management information comprises information related to the encryption of the second audio data.

8. The recording medium of claim 7, wherein the reproducing management information is stored in an audio title set information management table (ATSI_MAT) of the audio region.

9. A recording medium comprising:
a video region which stores encrypted moving picture data, unencrypted audio data and encrypted audio data; and
a predetermined region which stores reproducing management information enabling a reproducing apparatus to reproduce:
the encrypted moving picture data and the encrypted audio data,
the encrypted moving picture data and the unencrypted audio data, and
the encrypted audio data independently of the moving picture data.

10. The recording medium of claim 9, wherein the encrypted audio data is encrypted using an encryption method complying with a DVD-Video specification.

11. The recording medium of claim 9, wherein the encrypted audio data is encrypted using an encryption method complying with a DVD-Audio specification.

12. The recording medium of claim 9, wherein the reproducing management information is stored in the video region.

13. The recording medium of claim 12, wherein the reproducing management information is stored in a program chain information (PGCI) region of the video region.

14. The recording medium of claim 9, wherein the recording medium further comprises an audio region and the reproducing management information is stored in the audio region.

15. The recording medium of claim 14, wherein the reproducing management information is stored in an audio title set information management table (ATSI_MAT) of the audio region.

16. A recording apparatus comprising:
a first encryptor which encrypts input moving picture data;
a second encryptor which encrypts input audio data; and
a recording processor which:
records the encrypted audio data the encrypted moving picture data and the unencrypted input audio data in a video region of a recording medium, and
records reproducing management information for reproducing the encrypted audio data and the moving picture data and information for independently reproducing the encrypted audio data in a predetermined region of the recording medium.

17. The recording apparatus of claim 16, further comprising:
a first encoder which encodes the input moving picture data and provides the encoded moving picture data to the first encryptor; and
a second encoder which encodes the input audio data and provides the encoded audio data to the second encryptor.

18. The recording apparatus of claim 17, further comprising:
a third encoder which encodes audio data, which is not encrypted and provides the unencrypted encoded audio data to the recording processor.

19. The recording apparatus of claim 16, wherein the second encryptor encrypts the audio data using an encryption method complying with a DVD-Video specification.

20. The recording apparatus of claim 16, wherein the second encryptor encrypts the audio data using an encryption method complying with a DVD-Audio specification.

21. The recording apparatus of claim 16, wherein the recording processor records the reproducing management information in the video region.

22. The recording apparatus of claim 21, wherein the recording processor records the reproducing management information in a program chain information (PGCI) region of the video region.

23. The recording apparatus of claim 21, wherein the recording processor further records audio data and related additional information and reproducing management information of video data and/or audio data of the video region in an audio region of the recording medium.

24. The recording apparatus of claim 23, wherein the recording processor further records reproducing management information comprising information related to the encryption of the second audio data.

25. The recording apparatus of claim 23, wherein the recording processor records the reproducing management information in an audio title set information management table (ATSI_MAT) of the audio region.

26. An apparatus for reproducing a recording medium having separate regions, a video region and an audio region, moving picture data and audio data recorded in the video region, and reproducing management information recorded in a predetermined region and used to reproduce the moving picture data and/or the audio data, the reproducing apparatus comprising:
a reproducing processor which reads the reproducing management information from the recording medium, analyzes whether the audio data and/or the video data recorded on the recording medium are encrypted, determines the encryption method based on the read reproducing management information, and reads the moving picture and/or the audio data from the recording medium;
a first decryptor which decrypts the moving picture data read from the recording medium, according to information on whether the data is encrypted and the encryption method determined by the reproducing processor; and
a second decryptor which decrypts the audio data read from the recording medium, according to information on whether the data is encrypted and the encryption method determined by the reproducing processor.

27. The reproducing apparatus of claim 26, wherein the second decryptor decrypts the audio data using an encryption method complying with a DVD-Video specification and/or a DVD-Audio specification.

28. The reproducing apparatus of claim 26, wherein the reproducing processor reads the reproducing management information from one of the video region and the audio region of the recording medium.

29. The reproducing apparatus of claim 28, wherein the reproducing processor reads the reproducing management information from one of a program chain information (PGCI) region of the video region and an audio title set information management table (ATSI_MAT) of the audio region.

30. The reproducing apparatus of claim 26, further comprising:
a first decoder which decodes the video data decrypted by the first decryptor; and
a second decoder which decodes the audio data decrypted by the second decryptor,
wherein the reproducing processor provides the read audio data to the second decoder without decryption if the read audio data is not encrypted.

31. An apparatus for reproducing a recording medium having separate regions, a video region and an audio region, moving picture data and encrypted audio data recorded in the video region, and reproducing management information recorded in a predetermined region and used to reproduce the moving picture data and/or the audio data, the reproducing apparatus comprising:
a reproducing processor which reads the reproducing management information from the recording medium, analyzes whether audio data recorded on the recording medium is encrypted, determines the encryption method based on the read reproducing management information, and reads the audio data from the recording medium; and
a decryptor which decrypts the audio data read from the recording medium, according to information on whether the audio data is encrypted and the encryption method determined by the reproducing processor.

32. The reproducing apparatus of claim 31, wherein the decryptor decrypts the audio data using an encryption method complying with a DVD-Video specification and/or a DVD-Audio specification.

33. The reproducing apparatus of claim 31, wherein the reproducing processor reads the reproducing management information from one of the video region and the audio region of the recording medium.

34. The reproducing apparatus of claim 33, wherein the reproducing processor reads the reproducing management information from one of a program chain information (PGCI) region of the video region and an audio title set information management table (ATSI_MAT) of the audio region.

35. The reproducing apparatus of claim 31, further comprising:
a decoder which decodes the audio data decrypted by the decryptor,
wherein the reproducing processor provides the read audio data to the decoder without decryption if the read audio data is not encrypted.

36. A method of recording data on a recording medium having a video region for recording moving picture data and an audio region for recording audio data and related additional information, the recording method comprising:
encrypting input video data and input audio data, and recording the encrypted video data and the encrypted audio data in the video region;
recording the input audio data in the video region without encryption;
recording reproducing management information for reproducing the encrypted video data and/or encrypted audio data in a predetermined region of the recording medium.

37. The recording method of claim 36, wherein the encrypting further comprises encrypting the audio data using an encryption method complying with a DVD-Video specification.

38. The recording method of claim 36, wherein the encrypting further comprises encrypting the audio data using an encryption method complying with a DVD-Audio specification.

39. The recording method of claim 36, wherein the recording further comprises storing the reproducing management information in the video region.

40. The recording method of claim 39, wherein the recording further comprises storing the reproducing management information in a program chain information (PGCI) region of the video region.

41. The recording method of claim 36, wherein the recording further comprises:
storing reproducing management information of the video data and/or audio data of the video region in the audio region, and
storing information relating to the encryption of the encrypted audio data with the reproducing management information.

42. The recording method of claim 41, wherein the recording further comprises storing the reproducing management information in an audio title set information management table (ATSI_MAT) of the audio region.

43. A method of reproducing a recording medium having separate video and audio regions, the video region having moving picture data and encrypted audio data recorded therein and a predetermined region having reproducing management information recorded therein, the reproducing management information used to reproduce the moving picture data and/or the audio data, the reproducing method comprising:
reading the reproducing management information from the recording medium;
analyzing whether the audio data recorded on the recording medium is encrypted and determining the encryption method, based on the reproducing management information read from the recording medium;
reading the audio data from the recording medium;
decrypting the audio data read from the recording medium, according to the determined encryption method if the audio data is encrypted; and
decoding the decrypted audio data.

44. The reproducing method of claim 43, wherein the decrypting of the audio data is performed using an encryption method complying with a DVD-Video specification and/or a DVD-Audio specification.

45. The reproducing method of claim 43, wherein the reproducing management information is read from in the video region or the audio region.

46. The reproducing method of claim 45, wherein the reproducing management information is read from one of a program chain information (PGCI) region of the video region and an audio title set information management table (ATSI_MAT) of the audio region.

47. The reproducing method of claim 43, further comprising:

analyzing whether the moving picture data is encrypted and determining the encryption method, based on the reproducing management information read from the recording medium;

reading the moving picture data from the recording medium;

decrypting the moving picture data read from the recording medium, according to information on whether the moving picture data is encrypted and the encryption method, and decoding the decrypted moving picture data if the moving picture data is encrypted.

48. The reproducing method of claim 43, further comprising decoding the audio data read from the recording medium without decryption if the data is not encrypted.

49. A data structure for a recording medium, the data structure comprising:

a first region comprising:

moving picture information, first audio information corresponding to a sound sequence and associated with the moving picture information, and second audio information corresponding to the sound sequence, encrypted according to a first specification and associated with the moving picture information;

a second region comprising third audio information corresponding to the sound sequence and encrypted according to a second specification; and reproducing management information enabling a reproducing apparatus to reproduce any of the third audio information, a combination of the third audio information and the moving picture information, a combination of the moving picture information and the first audio information and a combination of the moving picture information and the second audio information.

50. The data structure of claim 49, wherein the first audio information is encoded with using at least one of a lower sampling frequency, a lesser number of quantization bits, and a lower bit rate than the encoding of the second audio information.

* * * * *